United States Patent [19]

Nishida

[11] Patent Number: 5,204,915
[45] Date of Patent: Apr. 20, 1993

[54] METHOD OF EXTRACTING FEATURE FROM LINE PATTERN AND LINE PATTERN RECOGNITION METHOD USING THE SAME

[75] Inventor: Hirobumi Nishida, Sagamihara, Japan

[73] Assignee: Ricoh Company, Ltd., Tokyo, Japan

[21] Appl. No.: 584,800

[22] Filed: Sep. 19, 1990

[30] Foreign Application Priority Data

Sep. 21, 1989 [JP] Japan .................................. 1-245507

[51] Int. Cl.⁵ .............................................. G06K 9/48
[52] U.S. Cl. ...................................... 382/21; 382/23; 382/24
[58] Field of Search ..................... 382/21, 23, 24, 25, 382/56, 16

[56] References Cited

U.S. PATENT DOCUMENTS

| | | | |
|---|---|---|---|
| 4,040,009 | 8/1977 | Kadota et al. | 382/21 |
| 4,685,124 | 8/1987 | Ooi et al. | 382/24 |
| 4,718,103 | 1/1988 | Shojima et al. | 382/21 |
| 4,748,443 | 5/1988 | Uehara et al. | 382/55 |
| 4,777,651 | 10/1988 | McCann et al. | 382/21 |
| 4,878,249 | 10/1989 | Mifune et al. | 382/21 |
| 4,891,750 | 1/1990 | Pastor et al. | 382/25 |
| 4,905,295 | 2/1990 | Sato | 382/21 |
| 4,987,603 | 1/1991 | Ohnishi et al. | 382/25 |

OTHER PUBLICATIONS

Henry S. Baird, "Feature Identification for Hybrid Structural/Statistical Pattern Classification," *Computer Vision, Graphics, and Image Processing*, 42, 1988, pp. 318-333.

Shunji Mori, "A Non-Metric Model of Handprinted Characters," *Transaction of the Institute of Electronics and Communication Engineers of Japan*, vol. J 62-D, No. 10, pp. 641-646, Oct. 1979.

*Primary Examiner*—Joseph Mancuso
*Attorney, Agent, or Firm*—Mason, Fenwick & Lawrence

[57] ABSTRACT

A method of extracting a feature from a line pattern comprising the steps of (a) extracting a thinned line from the line pattern, (b) finding one or a plurality of singular points which are formed on the thinned line, (c) decomposing each of the singular points into a plurality of vertices, (d) generating strokes due to the finding of pairs of the vertices, obtained by the step (c), which are regarded as identical to each other, (e) converting each of the strokes into a primitive sequence obtained by a concatenation of primitives, and (f) generating a binary relation between each two primitive sequences obtained by the step (e), so that the line pattern is featured by a combination of primitive sequences obtained by the step (e) and the binary relation between each of the primitive sequences.

7 Claims, 11 Drawing Sheets

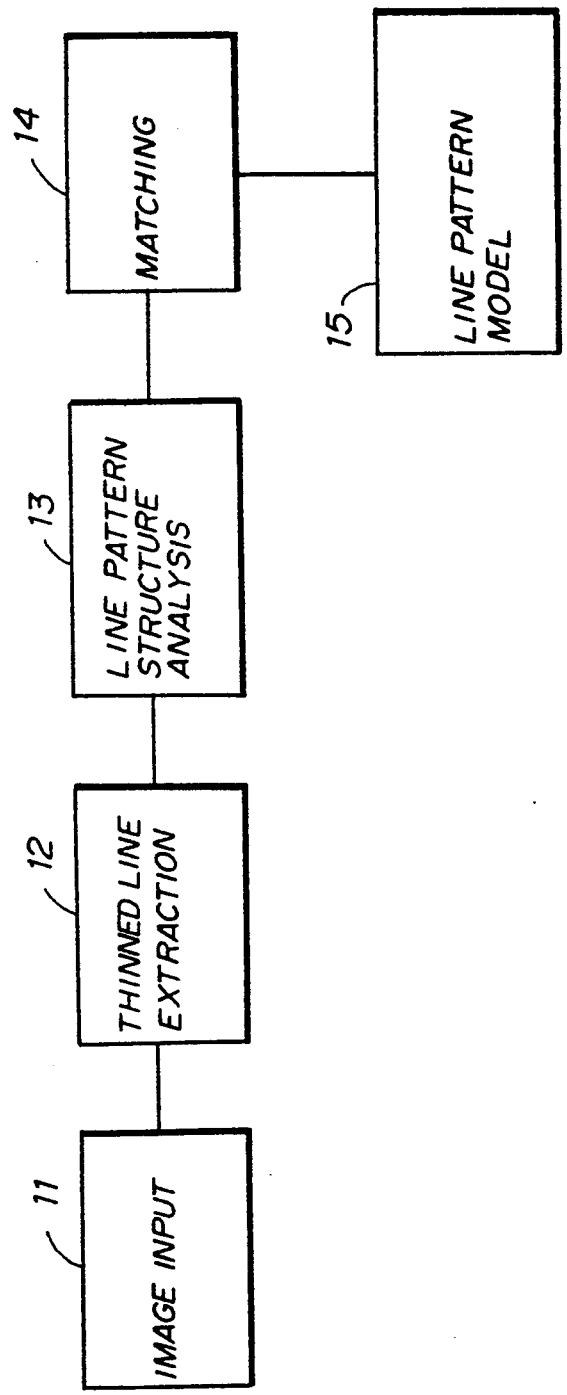

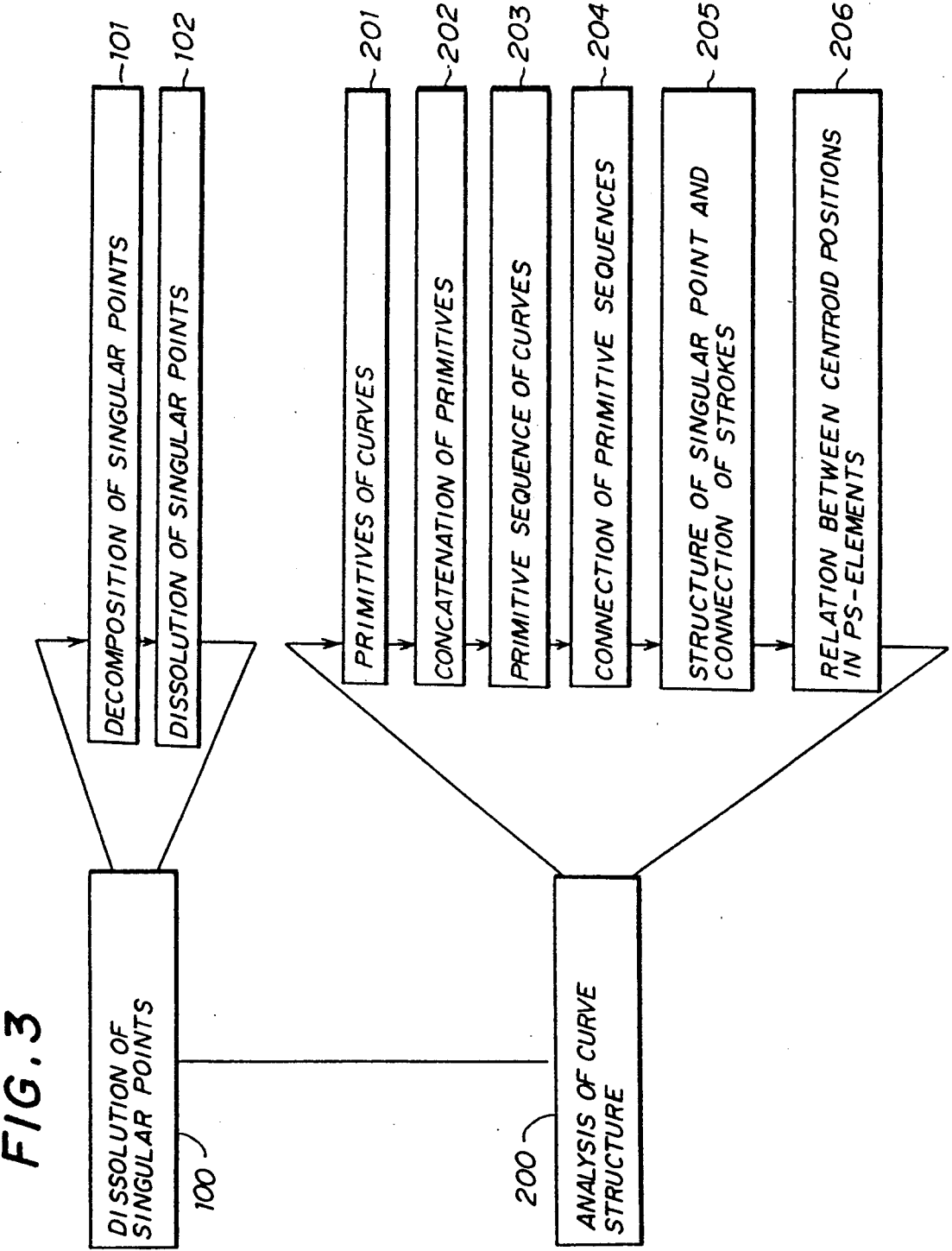

FIG. 7(a)
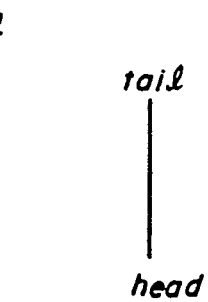
FIG. 7(b)
FIG. 7(c)
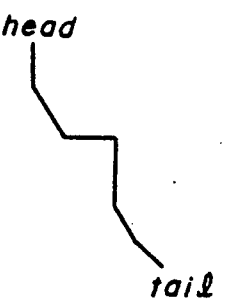
FIG. 7(d)
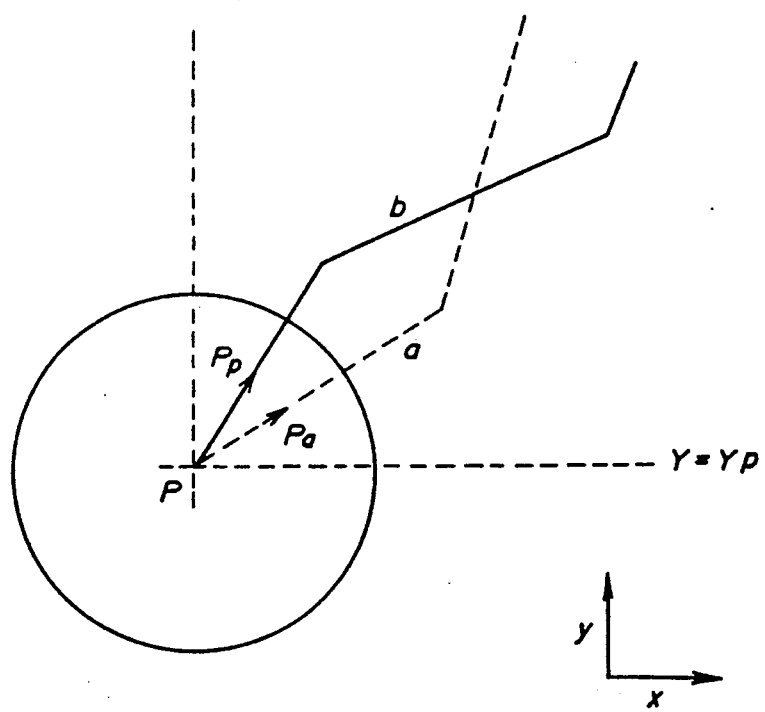
FIG. 8

[ /, head, \, tail ]

[ |, head, \, tail ]

[ /, head, |, head ]

[ /, head, /, head ]

[\, head, /, head]

[−, head, /, head]

[\, head, −, head]

[\, head, \, head]

[/, tail, \, head]

[|, tail, \, head]

[/, tail, |, tail]

[/, tail, /, tail]

[\, tail, /, tail]

[−, tail, /, tail]

[\, tail, −, tail]

[\, tail, \, tail]

METHOD OF EXTRACTING FEATURE FROM LINE PATTERN AND LINE PATTERN RECOGNITION METHOD USING THE SAME

BACKGROUND OF THE INVENTION

The present invention generally relates to a method of extracting a feature from a line pattern and a line pattern recognition method using the same, and more particularly to a method of extracting a feature from a line pattern and a line pattern recognition method which are suitable for recognizing hand written patterns, such as hand written characters and hand written drawings, by an off-line process.

In hand written line patterns, such as hand written characters and hand written drawings, there are various pattern changes in a line pattern (a character) so that it is difficult to exactly recognize a hand written pattern by an off-line process.

Conventionally, a method of extracting a feature from a hand written line pattern and a line pattern recognition method, in which the contours of the line pattern or the background of the line pattern are analyzed, have been proposed. In such conventional methods, the analysis results are obtained by use of feature parameter vectors which strongly firmly depend on a determined coordinate system so that it is necessary to normalize a line pattern before analyzing. That is, it is necessary to convert a line pattern data indicated by a coordinate system into a data indicated by a predetermined normal coordinate system. Thus, if the normalization of the line pattern fails, the feature parameter vector is changed so that a recognition error and a rejection which indicates a state where it is impossible to recognize the line pattern occur.

In order to eliminate the disadvantage described above, a quasi-topological method has been proposed (SHUNJI MORI: A Non-Metric Model of Handprinted Characters, Transaction of the Institute of Electronics and Communication Engineers of Japan, Vol. J 62 - D, No. 10, pp. 641-646, Oct. 1979). In this quasi-topological method, the analysis results depend on only the directions of coordinate axes, and do not depend on coordinate values. Then, the background area structured by strokes (lines) is analyzed by use of a primitive sequence of a curve. However, the process of calculating the primitive sequence is complicated, and it is difficult to apply the calculation process to various primitive sequences. A concatenation between the primitive sequences is indefinite. In addition, the feature of the background of the line pattern inadequately corresponds to a user's visual sense so that it is difficult to recognize a hand written character whose shape has greatly changed.

SUMMARY OF THE INVENTION

Accordingly, a general object of the present invention is to provide a method of extracting a feature from a line pattern and a line pattern recognition method using the same, to eliminate the disadvantages of the aforementioned prior art.

A more specific object of the present invention is to provide a method of extracting a feature from a line pattern and a line pattern recognition method which is capable of analyzing a hand written pattern with a condition close to the user's visual sense.

Another object of the present invention is to provide a method of extracting a feature from a line pattern and a line pattern recognition method in which a process for recognizing a hand written line pattern is easy to perform and it is possible to increase the recognition rate.

The above mentioned objects of the present invention can be achieved by a method of extracting a feature from a line picture comprising the steps of (a) extracting a thinned line from the line pattern, (b) finding one or a plurality of singular points which are formed on the thinned line, each of the singular points being defined as a vertex to which three or more branches are connected, (c) decomposing each of the singular points into a plurality of vertices, each of which has the same coordinate as a corresponding singular point, and (d) generating strokes due to the finding of pairs of the vertices, obtained by the step (c), which are regarded as identical to each other, so that the line pattern is featured by a structure of each of the singular points and a connection relation of the strokes.

The above mentioned objects of the present invention can also be achieved by a method of extracting feature from a line picture comprising the steps (a) through (d) and the steps of (e) converting each of the strokes into a primitive sequence obtained by a concatenation of primitives, each of which is a monotone curve, the monotone curve being a curve which is either non-increasing or non-decreasing, and (f) generating a binary relation between each two primitive sequences obtained by the step (e), so that the line pattern is featured by a combination of primitive sequences obtained by the step (e) and the binary relation between each of the primitive sequences.

The above mentioned objects of the present invention can be achieved by a line pattern recognition method comprising the steps of (a) extracting a thinned line from the line pattern, (b) finding one or a plurality of singular points which are formed on the thinned line, each of the singular points being defined as a vertex to which three or more branches are connected, (c) decomposing each of the singular points into a plurality of vertices, each of which has the same coordinate as a corresponding singular point, (d) generating strokes due to the finding of pairs of the vertices, obtained by the step (c), which are regarded as identical to each other, (e) converting each of the strokes into a primitive sequence obtained by a concatenation of primitives, each of which is a monotone curve, the monotone curve being a curve which is either non-increasing or non-decreasing, (f) generating a binary relation between each two primitive sequences obtained by the step (e), so that the line pattern is featured by a combination of primitive sequences obtained by the step (e) and the binary relation between each of the primitive sequences, and (g) comparing a line pattern featured by a combination of primitive sequences obtained by the step (e) and the binary relation between each of the primitive sequences obtained by the step (f), with each of the standard models describing primitive sequences and the binary relation between each two primitive sequences, so that a matching of the line pattern and the standard models is performed on the basis of structural matching, wherein a result of the matching is a result of a recognition of the line pattern.

Additional objects, features and advantages of the present invention will become apparent from the following detailed description when read in conjunction with the accompanying drawings.

DESCRIPTION OF THE DRAWINGS

FIG. 2 is a block diagram showing the functions of the recognition apparatus shown in FIG. 1;

FIG. 3 is a flow chart showing a process for analyzing a curve in a line pattern structure analysis portion shown in FIG. 2;

FIG. 7 shows types of primitives;

FIG. 8 shows an example of a concatenation of primitives;

DESCRIPTION OF THE PREFERRED EMBODIMENTS

A description will now be given of a preferred embodiment.

Figure 1:
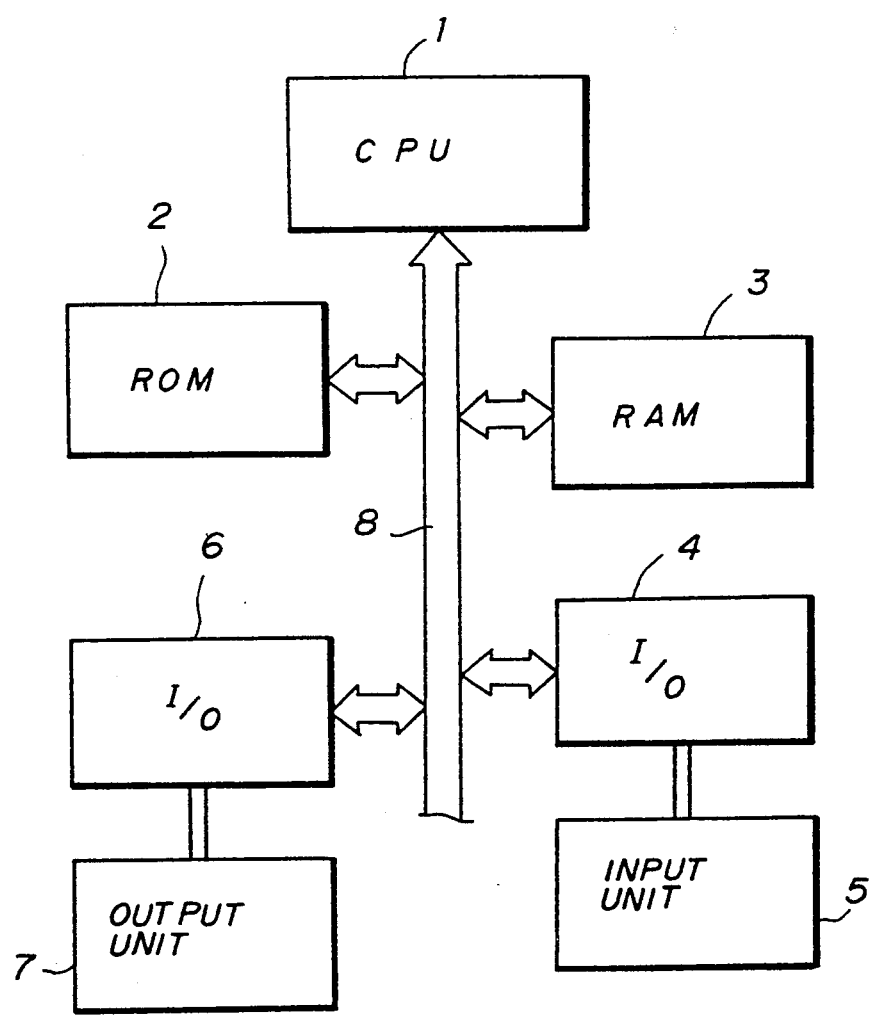
FIG. 1 is a block diagram showing the basic structure of a recognition apparatus of an embodiment according to the present invention.

FIG. 1 shows a basic structure of a recognition apparatus. Referring to FIG. 1, the recognition apparatus has a CPU 1 (Central Processing Unit), a ROM 2 (Read Only Memory), a RAM 3 (Random Access Memory), an interface 4 to which an input unit 5 including an optical character reader (OCR), a key board and so on are connected, and an interface 5 to which an output unit 7 including a display unit, a printer and so on are connected. The CPU 1, the ROM 2, the RAM 3 and the interfaces 4 and 6 are connected to each other by a system bus 8. Programs are stored in the ROM 2. The CPU 1 processes data in accordance with predetermined programs in the ROM 2. Data generated by the processing of the CPU 1 is stored in the RAM 3. An area for a recognizing process is determined in the RAM 3. Image data input from the input unit 5 is supplied though the interface 4 and system bus 8 to the CPU 1. Predetermined processing results in the CPU 1 are supplied through the system bus 8 and the interface 6 to the output unit 7.

FIG. 2 shows a function of the recognition apparatus shown in FIG. 1. Referring to FIG. 2, an image input portion 11 is included in the input unit 5 shown in FIG. 1. A thinned line extraction portion 12, a line pattern structure analysis portion 13 and a matching portion 14 are respectively included in the CPU 1 shown in FIG. 1. A line pattern model portion 15 is included in the ROM 2 and the RAM 3 shown in FIG. 1. Hand written line patterns such as hand written characters and hand written drawings are read by the image input portion 11. The image input portion 11 outputs digital image data. The thinned line extraction portion 12 inputs the digital image data from the image input portion 11, and then extracts the thinned line corresponding to the digital image data. The thinned line extraction portion 12 then outputs a thinned line data. The line pattern structure analysis portion 13 inputs the thinned line data from the thinned line extraction portion 12 and analyzes a curve structure of the thinned line.

Thus, the line pattern structure analysis portion 13 extracts a feature of the line pattern. A standard model of each of a plurality of line patterns is recorded in the line pattern model portion 15. The matching portion 14 compares the feature of the input line pattern, which is obtained by the line pattern structure analysis portion 13, with the standard model of each of the line patterns in the line pattern model portion 15. Then, the line pattern corresponding to the standard mode according to the feature of the input line pattern is obtained as the recognition result.

A detailed description will now be given of the line pattern structure analysis portion 13, the matching portion 14 and the line pattern model portion 15.

The line pattern structure analysis portion 13:

The line pattern structure analysis portion 13 operates in accordance with the flow chart shown in FIG. 3. Referring to FIG. 3, the process in the line pattern structure analysis portion 13 has a step 100 which dissolves singular points and a step 200 which analyzes a curve structure.

(1) Dissolution of the singular points (step 100)

In the step 100 which dissolves singular points, the structure of each of the singular points on the curve is analyzed, and then each of the singular points is dissolved. Thus, a plurality of components (strokes) are obtained. The step 100 has a step 101 to decompose the singular points and a step 102 to dissolve the singular points.

(i) Decomposition of the singular points (step 101)

The output from the thinned line extraction portion 12 is a piecewise linear curve expressed in terms of an undirected graph $G = (V, E)$, where V is a set of vertices and E is a set of edges. That is, E is a subset of $V^2$ and $(v, w)$ is an element of E. In this case, there is an edge between two vertices v and an element $(v, w)$ and an element $(w, v)$ are regarded as being identical with each other. The graph $G = (V, W)$ is a simple graph (a graph which contains neither a self loop nor a multiple edge). The coordinate function $$\text{coord: } V \rightarrow R^2$$

is defined for each element v in V. A coord(v) corresponds to the coordinate of v.

An element, in v, whose order (the number of edges incident to the vertex) is equal to or more than 3 is defined as a singular point. For instance, in the thinned lines shown in FIG. 4, vertices p,q and r are respectively singular points. The order of singular point p shown in FIG. 4 (a) is equal to four. The order of singular point q shown in FIG. 4 (b) is also equal to four. The order of singular point r shown in FIG. 4 (c) is equal to three. For each singular point v, n new vertices v1, v2, ..., vn, where coord(vi)=coord (v), i=1, 2, ..., n (n is the order of singular point v) are introduced. Next, for each of n vertices w1, w2, ..., wn which are adjacent to singular point v, a corresponding new edge (vi, wi), i=1, 2, ..., n is introduced, and then the singular point v is removed. The vertices vi (i=1, 2, ..., n) have the same coordinates as the singular point v, however they are regarded as being different from each other. After performing this operation, the graph G is decomposed into connected components each of which is a simple arc.

Figure 5A:
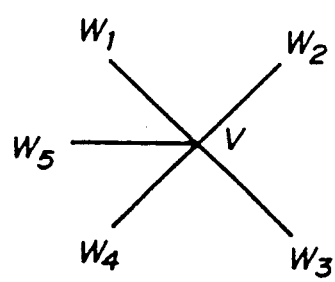
FIG. 5 shows decomposition and dissolution of a singular point.
Figure 5B:
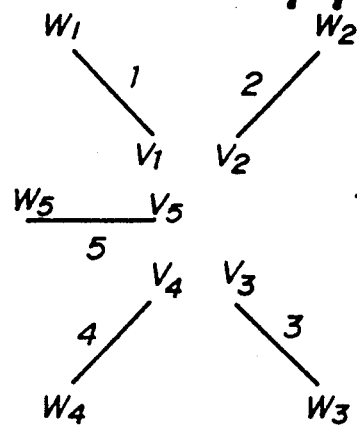
Figure 5C:
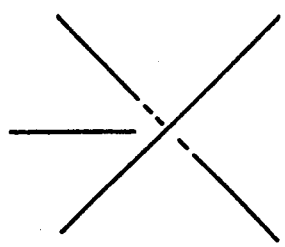

The simple arc is defined as a path passing through the identical vertex and the identical edge only once. FIG. 5 (a) shows an example of singular point v where the order is equal to five. The singular point v shown in FIG. 5 (a) is decomposed into vertices v1, v2, v3, v4, v5, and then edges (v1, w1) (v2, w2) v3, w3) (v4, w4) (v5, w5) are obtained, as shown in FIG. 5 (b). FIG. 5 (c) shows the result of the dissolution of the singular point v in this above case. The dissolution of the singular point will be described as follows.

(ii) Dissolution of the singular points (step 102)

It is assumed that, for the decomposed singular point v, coord(v)=(xo, yo), and, for n vertices wi (i=1, 2, . . . , n), coord(wi)=(xi, yi). A set of I={1, 2, . . . , n} is introduced, and for two elements i and j (i<j) in I, $\cos\theta_{ij}$ between a vector (xi−xo, yi−yo) and a vector (xj−xo, yj−yo) is calculated. A pair of i and j in the case where $\cos\theta_{ij}$ becomes the minimum is defined as a pair of $i_o$ and $j_o$ ($i_o<j_o$) For the pair of $i_o$ and $j_o$, a vertex $vi_o$ and a vertex $vj_o$ are regarded as identical with each other. That is, by substituting the edge ($vi_o$, $wi_o$) for the edge($vj_o$, $wj_o$), the vertex $vj_o$ is removed. Next, $I-\{i_oj_o\}$ is substituted for I, and then an operation which removes the vertex $vj_o$ is performed as has been described above. In addition, the recursive operation which $I-\{i_o, j_o\}$ is substituted for I and the removing of the vertex $vj_o$ is repeatedly performed until the dimensions of I becomes 1. This operation decomposes the vertex v into $\lceil n/2 \rceil$ vertices. $\lceil r \rceil$ represents the smallest integer which is equal to or greater than r. The input graph G is decomposed into connected components each of which is either a simple arc or a simple closed curve. The simple closed curve is defined as a closed curve passing through the identical vertex and the identical edge only once. The graph obtained by performing the operation as has been described above is called the stroke graph of G, each of the connected components being called a stroke. At the singular point whose order is five, the input graph is decomposed into $\lceil n/2 \rceil$ strokes.

Figure 4A:
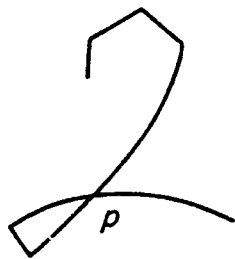
FIG. 4 shows examples of thinned line patterns.
Figure 4B:
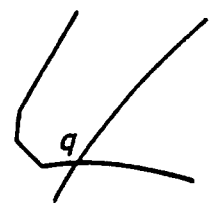
Figure 6A:
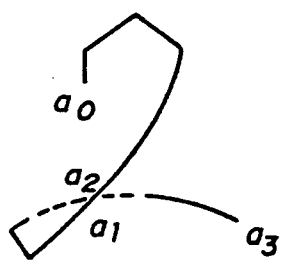
FIG. 6 shows examples of the dissolution of singular points included in the thinned line patterns shown in FIG. 4.
Figure 6B:
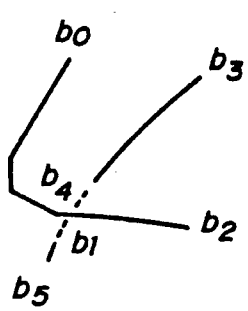

For example, the operation described above is performed for the patterns (input graphs) shown in FIG. 4 and the singular points are dissolved so that the stroke graphs as shown in FIG. 6 are obtained. That is, in FIG. 6 (a), the singular point p shown in FIG. 4 (a) is decomposed into vertices a1 and a2, in FIG. 6 (b), the singular point q shown in FIG. 4 (b) is decomposed into vertices b1 and b4, and in FIG. 6 (c), the singular point r is decomposed into vertices c1 and c3.

(2) Analysis of the curve structure step 200)

In the analysis of the curve structure, each of the strokes in the stroke graph is represented by a sequence of monotone curves. The monotone curve is called a primitive, and the sequence of the monotone curves is called a primitive sequence. The feature of the line pattern is defined as the curve structure by the binary relation between two primitive sequences. The binary relation includes a combination of two primitive sequences, a connection relation of two primitive sequences, a connection relation of two primitive sequences at the singular point and so on.

The step 200 which analyzes the curve structure has steps 201 through 206 as shown in FIG. 3.

(i) Primitives of the curves (step 201)

The primitives of the curves are determined in the step 201.

An xy-monotone curve is a curve whose x component and y component values are either non-increasing or non-decreasing. When coordinates at two end points of the xy-monotone curve are respectively P ($x_0$, $y_0$) and Q ($x_1$, $y_1$), where $x_0<x_1$ if $x_0 \neq x_1$ and $y_0<y_1$ if $x_0=x_1$, the point P is called a head and the point Q is called a tail. The xy-monotone curve where $y_0=y_1$ is called a y-constant curve, the xy-monotone curve where $(x_0-x_1)\times(y_0-y_1)>0$ is called an xy-changing curve and the xy-monotone curve where $x_0=x_1$ is called an x-constant curve. In addition the xy-monotone curve where $(x_0-x_1)\times(y_0-y_1)<0$ is called an xy-reverse changing curve. FIG. 7 illustrates examples of the xy-monotone curve. The y-constant curve shown in FIG. 7 (a) is a horizontal line segment, and is denoted by "—". FIG. 7 (b) illustrates a example of the xy-changing curve. The xy-changing curve is a curve which increases in the right direction and decreases in the left direction, and is denoted by "/". The x-constant curve shown in FIG. 7 (c) is a vertical line segment, and is denoted by "|". FIG. 7 (d) illustrates an example of the xy-reverse changing curve. The xy-reverse changing curve is a curve which increases in the left direction and decreases in the right direction, and is denoted by "\".

Primitives of the curves are defined by these above four classes of xy-monotone curves (ii) Concatenation of primitives (step 202)

The primitives of the curve are concatenated in step 202.

An concatenation law of two primitives is introduced so that a higher-order primitive is defined by the concatenation of the four classes of primitives as has been described above.

It is assumed that two xy-monotone curves cover a curve which is not a xy-monotone curve and the xy-monotone curves are not included in each other. These two xy-monotone curves are respectively defined as primitives a and b. P is a point in the intersection of the primitives a and b, and Q and R are points sufficiently close to P. Q and R are respectively included in only the primitive a and only the primitive b. In this case, it is assumed that a vector product between a vector $(x_q-x_p, y_q-y_p)$ and a vector $(x_r-x_p, y_r-y_p)$ is greater than 0, $$(x_q - x_p) \times (y_r - y_p) - (x_r - x_p) \times (y_q - y_p) > 0$$

, where coord(P)=($x_p$, $y_p$), coord(Q)=($x_q$, $y_q$), and coord(R)=($x_r$, $y_r$). In the assumptions described above, the binary operations for the concatenation of the primitives a and b $$a \xrightarrow{j} b, j=1,2,3,4$$

are defined as follows.

When both A and B are one of the types of "/", "\", "|", "—" and each of α and β are either the head or the tail, [A,α, B,β] represents that the primitive a of the type A and the primitive b of the type B are concatenated at α of the primitive a and β of the primitive b with each other.

Rule 1

$a \xrightarrow{1} b$ for [/, head, \ tail], [|, head, \, tail], [/, head, |, head] and [/, head, /, head] (downward convexity shown in FIGS. 9A through 9D).

Rule 2

$a \xrightarrow{2} b$ for [ , head, /, head], [\, head, —, head], [—, head, /, head] and [\, head, \, head] (leftward convexity shown in FIGS. 10A through 10D).

Rule 3

$a \xrightarrow{3} b$ for [/, tail, \, head ], [/, tail, |, tail ], [|, tail, \, head] and [/, tail,/,tail] (upward convexity shown in FIGS. 11A through 11D).

Rule 4

$a \xrightarrow{4} b$ for [\, tail, /, tail ], [\, tail, —, tail], [—, tail, /, tail ] and [\, tail,\, tail ] (rightward convexity shown in FIGS. 12A through 12D).

FIG. 8 shows the concatenation of two primitives. Referring to FIG. 8, two primitives a and b are concatenated in such a way that a pair of vectors $$(\vec{PP_a}, \vec{PP_b})$$

satisfies $PP_a \times PP_b > 0$. In this case, the concatenation of the primitives a and b is denoted by the concatenation operators $$a \xrightarrow{j} b.$$

P is a point in the intersection of the primitives a and b, Pa and Pb are respectively points in the primitives a and b, and Pa corresponds to Q described above and Pb corresponds to R described above.

(iii) Primitive sequence of the curves step 203)

In step 203, the primitive sequences are generated.

The xy-monotone curves which cover a curve and are not included in each other are extracted and the concatenation operations described above are performed on the xy-monotone curves (which are the primitives) so that it is possible to generate the primitive sequences. That is, the concatenation of a $\xrightarrow{j} b$ is regarded as a directed net work and the transitive law is applied to n+1 primitives so that it is possible to generate the following sequence:

$$a_0 \xrightarrow{j_1} a_1 \xrightarrow{j_2} \ldots > a_{n-1} \xrightarrow{j_n} a_n \quad (1)$$

where there exists neither b nor c such that $$b \xrightarrow{j_0} a_0, j_0 = 1, 2, 3, 4$$

$$a_n \xrightarrow{j_{n+1}} c, j_{n+1} = 1, 2, 3, 4$$

This sequence is called the primitive sequence.

When two or more xy-monotone curves are extracted from a curve and there is no sequence (1) which satisfies the above conditions, i.e. the sequence (1) is infinitely cycle, a label $<0, 0>$ is given to the curve. The label $<0, 0>$ is, for example, given to the circle.

A curve from which two or more xy-monotone curves are extracted and to which the label $<0, 0>$ is not given is decomposed into some elements. Each of the elements is called a ps-element and formed as described in formula (1). In the ps-element, each $a_i (i=1, 2, \ldots, n)$ is called a branch, and especially, $a_0$ is called a head branch and $a_n$ is called a tail branch. The end point of the ps-element, which is positioned at the head branch, is called a h-point, and the end point of the ps-element, which is positioned at the tail branch, is called a t-point. Furthermore, each of the points other than the h-point and the t-point is called an internal point. To the sequence having the n+1 xy-monotone curves, the label of primitive (termed a ps-label) $<ps, id>$ is given in accordance with the following rules.

$$ps = (n+1) + L + M \quad (2)$$

$$id = j_1 \quad (3)$$

where

L: the number of the concatenation $a_i \xrightarrow{j_1} a_{i+1}$ in which $a_i$ is the same type as $a_{i+1}$ (i+0, 1, ..., n−1).

M: the number of $a_i$ whose type is either "|" or "—" (i=1, 2, ..., n−1)

In the case where only one xy-monotone curve is extracted from the curve, a label $<1, 1>$ is given to the curve when the type of the xy-monotone curve is "—", a label $<1, 2>$ is given to the curve when the type of the xy-monotone curve is "/", a label $<1, 3>$ is given to the curve when the type of the xy-monotone curve is "|" and a label $<1, 4>$ is given to the curve when the xy-monotone curve is "\". In this case, the h-point and the t-point are respectively defined as the head of the xy-monotone curve and the tail thereof, and the head branch and the tail branch are not defined.

A description will now be give of an example of the procedure for giving the ps-label to the curves shown in FIG. 4.

Figure 13A:
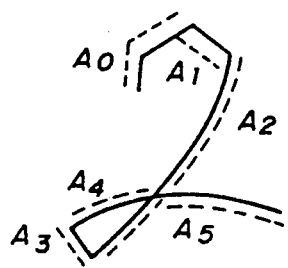
FIG. 13 shows examples of converting the strokes in the thinned line patterns shown in FIG. 4 to the primitives.
Figure 13B:
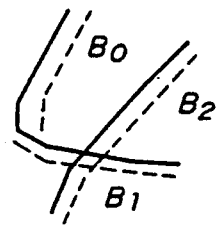
Figure 13C:
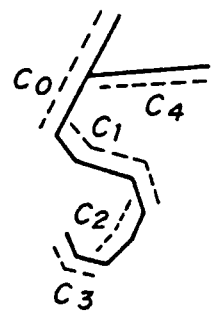

The curves shown in FIG. 4 (a) (b) (c) are respectively decomposed into the primitives (the xy-monotone curves), which are strokes of the curves, as shown in FIG. 13 (a) (b) (c). In FIG. 13 (a), the curve has primitives $A_0$ through $A_5$, in FIG. 13 (b), the curve has primitives $B_0$ through $B_2$, and in FIG. 13 (c), the curve has primitives $C_0$ through $C_4$. The type of primitives $A_0$, $A_2$, $A_4$, $B_0$, $B_2$, $C_0$, $C_2$ and $C_4$ is "/" and the type of the other primitives is "\". In FIG. 13, the concatenations of the primitives are obtained as follows:

$$A_0 \xrightarrow{3} A_1, A_1 \xrightarrow{4} A_2, A_2 \xrightarrow{1} A_3, A_3 \xrightarrow{2} A_4, A_4 \xrightarrow{3} A_5$$

$$B_1 \xrightarrow{2} B_0$$

$$C_1 \xrightarrow{2} C_0, C_1 \xrightarrow{4} C_2, C_2 \xrightarrow{1} C_3$$

On the basis of the concatenations of the primitives described above, the primitive sequence elements (ps elements) are obtained as follows (1) through (6):

$$A_0 \xrightarrow{3} A_1 \xrightarrow{4} A_2 \xrightarrow{1} A_3 \xrightarrow{2} A_4 \xrightarrow{3} A_5 \quad (1)$$

$$B_1 \xrightarrow{2} B_0 \quad (2)$$

$$B_2 \,(/) \quad (3)$$

$$C_1 \xrightarrow{2} C_0 \quad (4)$$

$$C_1 \xrightarrow{4} C_2 \xrightarrow{1} C_3 \quad (5)$$

$$C_4 \,(/) \quad (6)$$

Accordingly, the ps-labels are respectively given as being $<6, 3>$ for the case (1), $<2, 2>$ for the case (2), $<1, 2>$ for the case (3), $<2, 2>$ for the case (4), $<3, 4>$ for the case (5) and $<1, 2>$ for the case (6).

A description will now be given of other examples of the ps-labels given to curves with reference to FIG. 14.

Figure 14A:
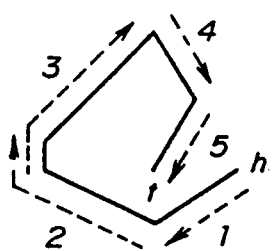
FIGS. 14 and 15 show other examples of primitive sequences.
Figure 14B:
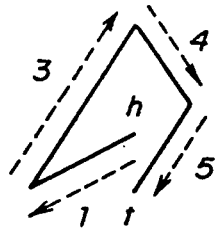
Figures 14C, 14D:
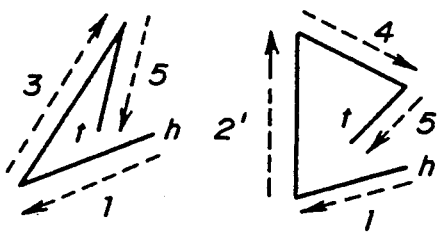

The ps-label given to each of the curves shown in FIG. 14 (a), (b), (c) and (d) is $<5, 1>$. In the case of FIG. 14 (a), both L and M are equal to 0. In the case of FIG. 14 (b) and (c), L is respectively equal to 1 and 2. In the case of FIG. 14 (d), M is equal to 1. The curve shown in FIG. 14(b) does not have primitive 2 which is included in the curve shown in FIG. 1 (a). The curve shown in FIG. 14 (c) does not have primitives 2 and 4 which are included in the curve shown in FIG. 14 (a). The curve shown in FIG. 14 (d) has a vertical primitive 2' (|) for which the primitives 2 and 3 included in the curve shown in FIG. 14 (a) are substituted.

Figure 15:
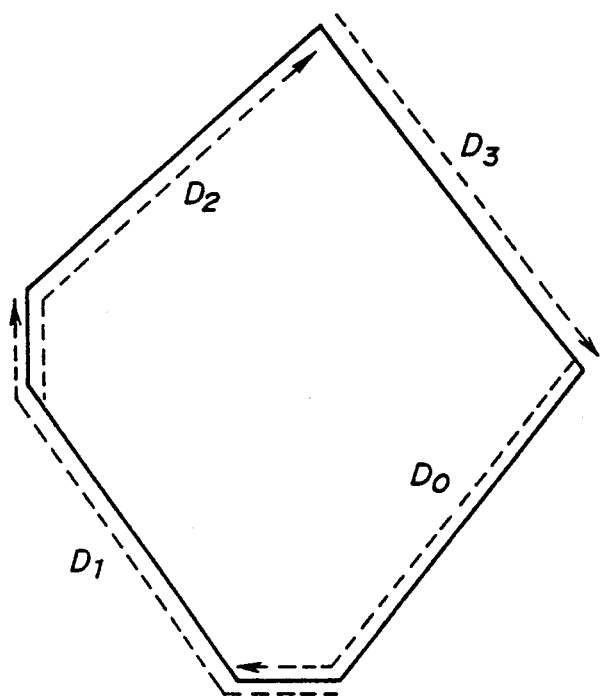

In addition, a curve in which the ps-label is $<0, 0>$ is shown in FIG. 15. In the curve shown in FIG. 15, the primitive sequence is obtained as follows:

$$\ldots \xrightarrow{4} D_0 \xrightarrow{1} D_1 \xrightarrow{2} D_2 \xrightarrow{3} D_3 \xrightarrow{4} D_4 \xrightarrow{1} D_5 \xrightarrow{2}$$

When the primitive sequence is cyclic as this case, the ps-label given to the curve is $<0, 0>$.

(iv) Connection of the primitive sequences (Feature parameter C) (step 204)

In step 204, the primitive sequences obtained as has been described above are connected to each other.

Each of the strokes which are obtained by the dissolution of the singular points is a simple arc or a simple closed curve so that the shape of the curve in which the singular points are dissolved can be represented by the connection of the ps-elements. In both of the following two cases, a ps-element $e_0$ having a label $<ps_0, id_0>$ is connected to another ps-element $e_1$ having a label $<ps_1, id_1>$.

The first case is called a h-connection. In this case, $id_0 - id_1 \equiv 2 \pmod 4$ and the head branch of $e_0$ is identical to the head branch of $e_1$.

This case is denoted by $$e_0 \xrightarrow{h} e_1 \quad (4)$$

where h means a head.

The second case is called a t-connection. In this case, $ps_0 + id_0 \equiv ps_1 + id_1 + 2 \pmod 4$ and the tail branch of $e_0$ is identical to the tail branch of $e_1$. This case is denoted by $$e_0 \xrightarrow{t} e_1 \quad (5)$$

where t means a tail. Each of these connections is defined as the feature parameter C.

In other words, when the stroke a represented by $$a : a_0 \xrightarrow{i_1} a_1 \xrightarrow{i_2} \ldots \xrightarrow{i_m} a_m$$

is connected to the stroke b represented by $$b : b_0 \xrightarrow{j_1} b_1 \xrightarrow{j_n} \ldots \xrightarrow{j_n} b_n$$

and the primitive $a_0$ in the stroke a is identical to the primitive $b_0$ in the stroke b, the connection of strokes a and b is called the h-connection and is denoted by $$a \xrightarrow{h} b.$$

When the primitive $a_m$ in the stroke a is identical to the primitive $b_n$ in the stroke b, the connection of the strokes a and b is called the t-connection and is denoted by $$a \xrightarrow{t} b.$$

For example, in the case shown in FIG. 13 (c), two ps-elements (4) and (5)

$$c_1 \xrightarrow{2} c_0 \quad (4)$$

$$c_1 \xrightarrow{4} c_2 \xrightarrow{1} c_3 \quad (5)$$

share the first primitive $c_1$ so that the connection of the ps-elements (4) and (5) is denoted by $$(4) \xrightarrow{h} (5).$$

(v) Structure of singular point and connection of strokes (Feature parameter S)(step 205)

In step 205, the structure of the singular point and the connection of the strokes are defined by the binary relation between the ps-elements The j-th ps-element obtained from i-th stroke by the procedure described above is defined as $e_{ij}$. The structure of the singular point in the input graph G is defined by the connection relation between the ps-elements which are included in the strokes corresponding to the input graph G. There are two types of connection of two ps-elements at the singular point. In the first type, termed the X-type, the ps-elements intersect each other, that is, the singular point is an internal point of each of the ps-elements. In the second type, termed the T-type, the singular point is the end point in the first ps-element and the internal point in the second ps-element. The structure of the singular point v is defined by use of the binary relation between $e_{ij}$ and $e_{i'j'}$, which includes the singular point v, as follows:

$$[e_{ij}, \alpha] \xrightarrow{n} [e_{i'j'}, \beta] \quad (6)$$

In formula (6), n represents the connection condition between $e_{ij}$ and $e_{i'j'}$ at the singular point v, that is, $n \in \{X, T\}$ stands, where "X" represents the connection of the X-type and "T" represents the connection of the T-type. $\alpha, \beta \in \{h, t, "-"\}$ stands, where "h" denotes the head branch, "t" denotes the tail branch and "—" denotes a branch other than the head branch and the tail branch. In formula (6), it is defined that the singular point v is a point (or an $\alpha$-point) included in the branch $\alpha$ of $e_{ij}$ and a point (or a $\beta$-point) included in the branch $\beta$ of $e_{i'j'}$. Formula (6) also defines the connection structure between the strokes This connection structure is defined as the feature parameter S.

$\lceil m/2 \rceil$ strokes are generally incident to the singular point v whose order is equal to m so that the number of the binary relations which define the structure of the singular point v, each of the binary relations being denoted by formula (6), is equal to or greater than $\lceil m/2 \rceil \times (\lceil m/2 \rceil - 1)/2$.

The feature parameter S is obtained from each of the graphs shown in FIG. 4 as follows.

The graph shown in FIG. 4 (a) has a ps-element having the label $<6, 3>$. This ps-element e corresponds to the case (1) shown in FIG. 13 (a). In this case, the structure of the singular point p is defined as $$[e, -] \xrightarrow{x} [e, -].$$

The graph shown in FIG. 4 (b) has a ps-element $e_1$ having the label $<2, 2>$ and a ps-element $e_2$ having the label $<1, 2>$. The ps-element $e_1$ corresponds to the case (2) shown in FIG. 13 (b), and the ps-element $e_2$ corresponds to the case (3) shown in FIG. 13 (b). In this case, the structure of the singular point q is defined as $$[e_1, h] \xrightarrow{x} [e_2, -].$$

The graph shown in FIG. 4 (c) has a ps-element $e_1$ having the label $<2, 2>$ and a ps-element $e_2$ having the label $<1, 2>$. The ps-element $e_1$ corresponds to the case (4) shown in FIG. 13 (c), and the ps-element $e_2$ corresponds to the case (6) shown in FIG. 13 (c). In this case, the structure of the singular point is defined as $$[e_1, t] \xrightarrow{1} [e_2, h].$$

(vi) Relation between centroid positions in ps-elements (Feature parameter R)(step 206)

The relation between the ps-elements which are not connected to each other is defined by the relation between the centroid positions in the ps-elements. For example, the ps-elements respectively belonging to connection components differing from each other in the input graph are not connected to each other so that the relation between these ps-elements is defined by the relation between the centroid positions therein. The relation between the centroid positions in the ps-elements is denoted by the following binary relation between $e_{ij}$ and $e_{i'j'}$:

$$e_{ij}(r_x, r_y) e_{i'j'}$$

Both $r_x$ and $r_y$ mean either one of "$<$", "$>$" or "$=$", $r_x$ represents the relation between x-coordinate values of the centroid positions in $e_{ij}$ and $e_{i'j'}$ and $r_y$ represents the relation between y-coordinate values of the centroid positions in $e_{ij}$ and $e_{i'j'}$. For example, when the following binary relation stands, $$e_{ij}(<, >) e_{i'j'}$$

the x-coordinate value of the centroid position in $e_{ij}$ is smaller than that of the centroid position in $e_{i'j'}$ and the y-coordinate value of the centroid position in $e_{ij}$ is greater than that of the centroid position in $e_{i'j'}$.

The line pattern model portion 15 :

A model M(I) for a character category I is defined as follows:

$$M(I) = (P, C, S, R, m_p, m_s)$$

P is a set of core (p $\in$ P) and a subset in the set which is denoted by $\{<0, 0>\} \cup \{<ps, id> | id \in \{1,2,3,4\}$ ps is a natural number$\}$. That is, P is a set of labels of primitive sequences.

C is a set of the connections of ps-elements which stands between two core (element) and is denoted by $$C \subseteq \{p_1 \xrightarrow{r} p_j | p_i, p_j \in P, r \in \{h, t\}\} \quad (9)$$

In the formula (9), $$p_1 \xrightarrow{r} p_j (p_i, p_j \in P, r \in \{h, t\})$$

has the same mean as formula (4) and (5).

S is a set of structures of singular points in I and is denoted by $$S \subseteq \{[p_i, \alpha] - [p_j, \beta] | p_i, p_j \in P, n \in \{X, T, XT\}, \alpha, \beta \in \{h, t, \phi\}\} \quad (10)$$

In the formula (10), $$[p_i, \alpha] - [p_j, \beta](p_i, p_j \in P, n \in \{X, T, XT\}, \alpha, \beta \in \{h, t, \phi\})$$

has the same meaning as the formula (6).

$$n = XT$$

represents that either the X-type or the T-type is permitted and, $$\alpha = \phi$$

represents that the singular point exists in an arbitrary branch of $p_i$ and is an internal point in $p_i$.

$$\beta = \phi$$

has the same meaning as $\alpha = \phi$ for $p_j$.

The singular points in the category I are denoted by $v_i$ ($i = 1, 2, \ldots, l$) and the order of th singular point $v_i$ is denoted by $m_i$. In addition, the following set is defined, $$S \bigcup_{i=1}^{l} \{v_i^1, v_i^2, \ldots, v_i^{k_i}\} \quad (11)$$

where $$k_i = \lceil m_i/2 \rceil (\lceil m_i/2 \rceil - 1)/2,$$

and $\overset{j}{v_i}$ corresponds to the intersection of strokes $s_{jo}$ and $s_{ji}$, when $\overset{j}{v_i}$ is not equal to $\overset{k}{v_i}, (\overset{j}{v_i} \neq \overset{k}{v_i})$, $\{s_{jo}s_{j1}\}$ is not equal to $\{s_{ko}, s_{k1}\}(\{s_{jo}, s_{j1}\} \neq \{s_{ko}, s_{k1}\})$. Each of the elements of S corresponds to one of the elements of SV.

R is a set of the relations of the centroid positions between cores and is denoted by $$R \subseteq \{p_i(r_x, r_y)p_j | p_i, p_j \in P, r_x, r_y \in \{<, >, \phi\}\} \quad (12)$$

In the formula (12), $$p_i(r_x, r_y)p_j(p_i, p_j \in P, r_x, r_y \in \{<, >, \phi\})$$

has the same meaning as the formula (7). The following formula, $$r_x = \phi$$

represents that the relation between the x-coordinate values of $p_i$ and $p_j$ is arbitrary. The following formula, $$r_y = \phi$$

has the same meaning as $r_x = \phi$ for the y-coordinate.

$m_p$ and $m_s$ are respectively mappings defined in p and S, and are denoted as follows:

$$m_p \rightarrow \{0, 1\} \quad (13)$$

$$m_s \rightarrow \{0, 1\} \quad (14)$$

$m_p$ represents whether the element in P is an essential element or a selective element. The essential element is an element which should exist in the result obtained by the analysis in the line pattern structure analysis portion 13. The selective element is an element which can either exist or not in the result obtained by the analysis.

When the element p in P (p∈P) is the essential element, $m_p(p)$ is equal to 1 ($m_p(p)=1$). When the element p in P is the selective element, $m_p(p)$ is equal to 0 ($m_p(p)=0$). $m_s$ is determined in the same manner as $m_p$ for S. For example, structures of models for categories "2", "4" and "5" shown in FIG. 4 are respectively as follows. $\phi$ means an arbitrary relation. In addition, the ps-label <ps, id> is denoted by integers calculated by $(10 \times ps + id - 1)$.

Category "2"
$P = \{0 : \{54\ 63\ 72\ 81\}\}$
$C = $ null $S = \{[0\ \phi] \overset{X}{-} [0\ \phi]\}$ $R = $ null Category "4"
$P = \{0: \{22\ 31\ 41\}\ 1: \{12\ 12\ 14\ 22\ 23\}\}$
$C = $ null $S = \{[0\ \phi] \overset{X}{-} [1\ \phi]\}$ $R = \{0\ (\phi >)\ 1\}$ Category "5"
$P = \{0: \{11\ 12\ 14\}\ 1: \{22\ 31\}\ 2: \{24\ 33\ 34\ 43\ 44\}\}$
$C = \{1\ \overset{h}{-}2\}$ $S = \{[0\ h] \overset{T}{-} [1\ t]\}$ $R = \{0\ (>\phi)\ 1\}$ A set of ps-elements obtained from the result of the analysis of the input graph G in the line pattern structure analysis portion 13 is denoted by $p_o = \{O_1, O_2, \ldots, O_m\}$. The label of $o_i$ ($i=1, 2, \ldots, m$) is denoted by l ab ($o_i$). The singular points in the input graph G are denoted by vi ($i=1, 2, \ldots, l$), and the order of the singular point vi is denoted by mi. In addition, the following set is defined $$S_o \overset{l}{\underset{i=1}{\cup}} \{v_i, v_i^1, v_i^2, \ldots, v_i^{ki}\} \quad (15)$$

where $ki = \lceil mi/2 \rceil (\lceil mi/2 \rceil - 1)/2,$ and $\overset{j}{v_i}$ has the same meaning as that in the case of formula (11).

The matching of the analysis result in the line pattern structure analysis portion 13 and the model M(I) is performed by finding the mapping f and the surjection g . The mapping f and the surjection g respectively satisfy the following conditions.

$f: P \to P_o \cup \{\phi\}$ (16)

$g: S \to S_o \cup \{\phi\}$ (17)

(Condition 1)
l ab (f(p)) ∈ p stands for an arbitrary 0 ∈ $P_o$ (Condition 2)
f(p) ≠ $\phi$ stands for an arbitrary p∈ P, where $m_p(p) = 1$.

(Condition 3)
When f(pi) ≠ $\phi$ and f(pj) ≠ $\phi$ for
$p_i \overset{r}{-} p_j \in C$, $f(p_i) \overset{r}{-} f(p_j)$ stands.

(Condition 4)
When f(pi) ≠ $\phi$ and f(pj) ≠ $\phi$ for
$p(r_x, r_y)p_j \in C$, $f(p_i)(r_x, r_y)f(p_j)$ stands.

(Condition 5)
When f(pi) ≠ $\phi$ and f(pj) ≠ $\phi$ for
$s = [p_i, \alpha] \overset{n}{-} [p_j, \beta] \in S$,
$[f(p_i), \alpha] \overset{n}{-} [f(p_j), \beta]$ stands in g(s).

(Condition 6)
When $g(s_0) = g(s_1)$ for arbitrary $s_0$,
$s_1 \in S$, $s_0 = s_1$ stands. In this case, $g(s) \neq \phi$ and
$g(s_0), g(s_1) \in S_0$ for s ∈ S which satisfies
$m_s(s) = 1$.

f which satisfies the conditions 1 through 4 is calculated by use of the back track method and so on. Then, g, which satisfies the conditions 5 and 6, is calculated on the basis of f as the same matter as f. The mappings f and g are fined by the procedure described above.

For example, the matching of the category "5" and the line pattern shown in FIG. 4 (c) is performed as follows.

Figure 4C:
Figure 6C:
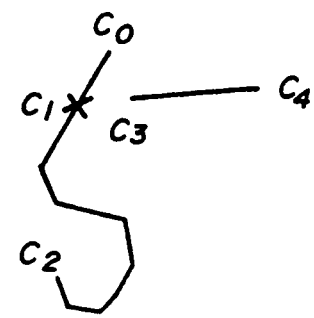
Figure 9A:
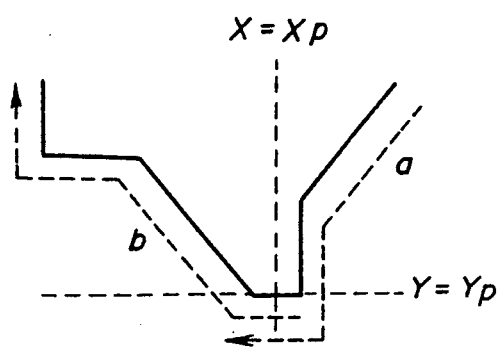
FIGS. 9A through 12D show types of concatenations of primitives.
Figure 9B:
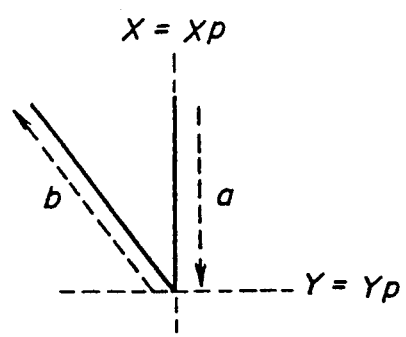
Figure 9C:
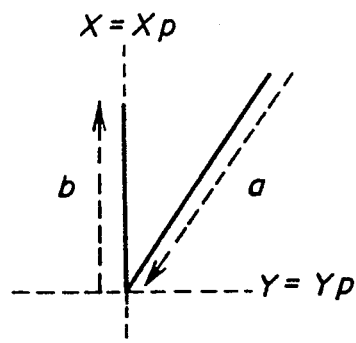
Figure 9D:
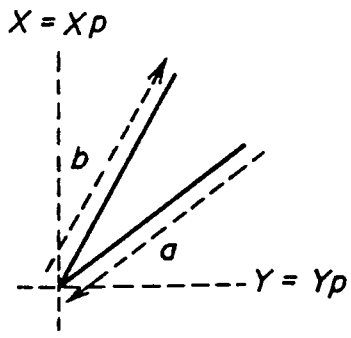
Figure 10A:
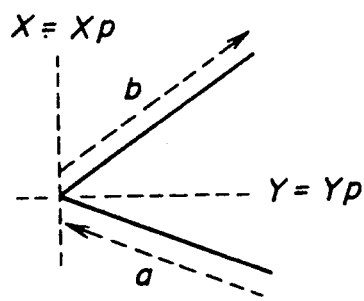
Figure 10B:
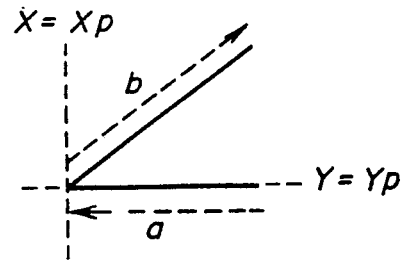
Figure 10C:
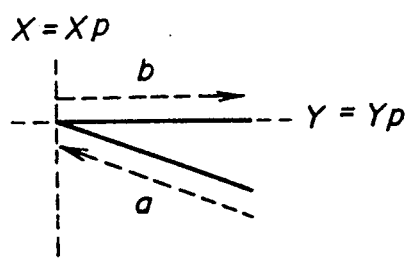
Figure 10D:
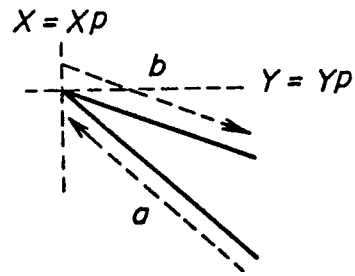
Figure 11A:
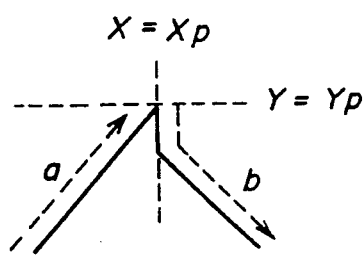
Figure 11B:
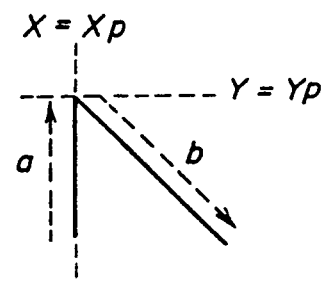
Figure 11C:
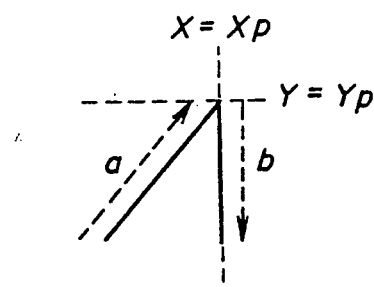
Figure 11D:
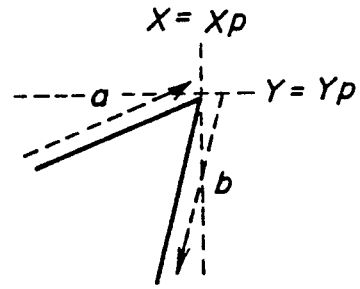
Figure 12A:
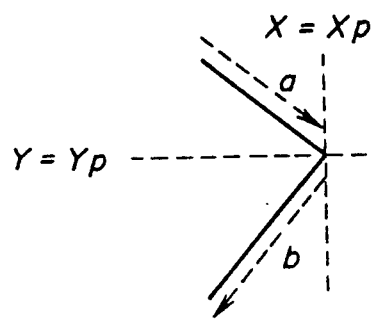
Figure 12B:
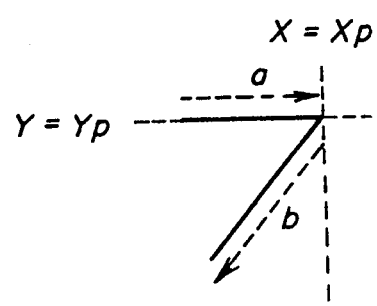
Figure 12C:
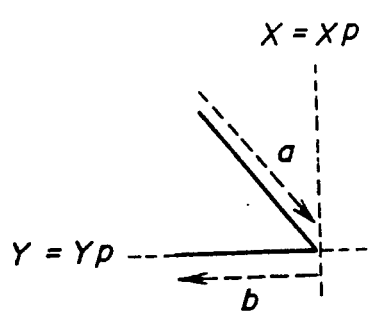
Figure 12D:
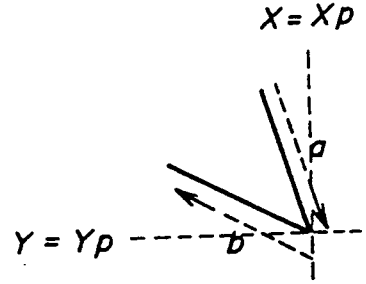

When the curve structure analysis is applied to the stroke graph, shown in FIG. 6(c), to which the input graph shown in FIG. 4(c) is converted, three ps-elements $e_1$, $e_2$, and $e_3$ are obtained. The labels of these ps-elements are as folows:

l ab($e_1$)= <2, 2> l ab($e_2$)= <3, 4> l ab($e_3$)= <1, 2>

These ps-elements respectively corresponds to the cases (4) (5) (6) shown in FIG. 13. In the case where $f(e_1)=1,$ $f(e_2)=2,$ and $f(e_3)=0,$ it is checked whether or not each of the conditions 1 through 6 is satisfied. The conditions 1 and 2 are obviously satisfied. $e_1 \overset{h}{-} e_2$ stands for the element $1 \overset{h}{-} 2$ of C, and $e_3 (>>) e_1$ stands for the element $0 (>\phi) 1$ of R , so that the conditions 3 and 4 are respectively satisfied. In addition, for the element $s=[0, h] \overset{T}{-} [1, t]$ of S, $[e_1, t] \overset{T}{-} [e_3, h]$ stands so that the conditions 5 and 6 are respectively satisfied Thus, the function f and g are fined.

Figure 16:
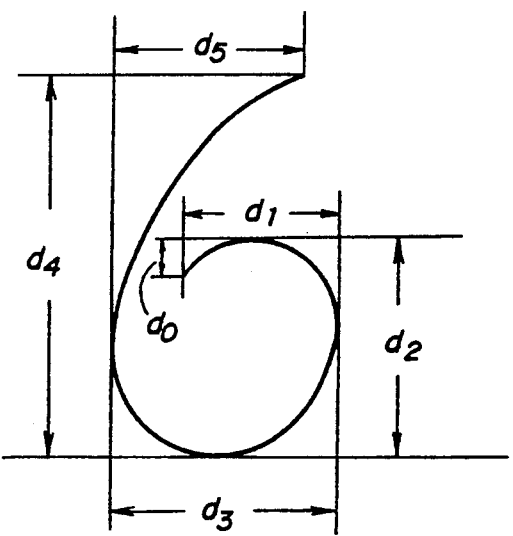
FIG. 16 shows an example of a character to which a hierarchical line pattern recognition process is applied.

The curve shown in FIG. 16 has the label <5, 3>. This curve can be matched to the characters "0" or "6" in accordance with the shape of the curve. A curve like this is recognized by applying the statistical analysis to the parameter vectors describing the shape of the curve. For example, in the curve shown in FIG. 16, the either character "0" or "6" is recognized by applying the linear discriminate analysis to a vector $(d_1/d, d_2/d, \ldots, s/d)$ where $$d = \sum_{i=0}^{5} d_i.$$

According to the present invention, each of the singular points is decomposed, a plurality of strokes are obtained and then a line pattern is featured by a structure of each of the singular points and a connection relation of strokes. Thus, it is possible to analyze a hand written pattern with a condition close to a user's visual sense.

The line pattern is featured by the combination of primitive sequences and the binary relation between each two primitive sequences so that it is possible to obtain a simple curve structural description.

The line pattern is recognized on the basis of an analysis which is not influenced by the origin but the direction of the coordinate axes so that it is possible to recognize a character, whose shape is greatly changed, on the basis of a smaller dictionary.

In addition, the statistical analysis is applied to only a pattern which is not recognized by the structural description method so that it is possible to efficiently and definitely recognize a line pattern.

The present invention is not limited to the aforementioned embodiments, and variations and modifications may be made without departing from the scope of the claimed invention.

What is claimed is:

1. A method of extracting a feature from a line pattern comprising the steps of:
   (a) extracting a thinned line from the line pattern, said thinned line being represented by branches which are partitioned from each other by vertices;
   (b) finding one or a plurality of singular points which are formed on said thinned line, each of said singular points being defined as a vertex to which three or more branches are connected;
   (c) decomposing each of said singular points into a number of vertices that is the same as the number of branches connected thereto, based on a presumption that each of said singular points is included in all the branches connected to each of said singular points, wherein each of said vertices has the same coordinate as a corresponding singular point; and
   (d) selecting vertices regarded as being identical to each other from the vertices obtained in said step (c), based on conditions in which the branches are connected to each of said singular points, wherein branches including the selected vertices are connected to each other, so that strokes are generated, each stroke having branches successively connected to each other;
   wherein the line pattern is characterized by the singular points and a connection relation of said strokes with respect to each of the singular points.

2. A method of extracting a feature from a line pattern comprising the steps of:
   (a) extracting a thinned line from the line pattern, said thinned line being represented by branches which are partitioned from each other by vertices;
   (b) finding one or a plurality of singular points which are formed on said thinned line, each of said singular points being defined as a vertex to which three or more branches are connected;
   (c) decomposing each of said singular points into a number of vertices that is the same as the number of branches connected thereto, based on a presumption that each of said singular points is included in all the branches connected to each of said singular points, wherein each of said vertices has the same coordinate as a corresponding singular point;
   (d) selecting vertices regarded as being identical to each other from the vertices obtained in said step (c), based on conditions in which the branches are connected to each of said singular points, wherein branches including the selected vertices are connected to each other, so that strokes are generated, each stroke having branches successively connected to each other;
   (e) converting each of the strokes into a primitive sequence obtained by a concatenation of primitives, each of which is a monotone curve, said monotone curve being a curve which is either non-increasing or non-decreasing; and
   (f) generating a binary relation between each two primitive sequences obtained by said step (e);
   wherein the line pattern is characterized by a combination of primitive sequences obtained by said step (e) and said binary relation between each of the primitive sequences.

3. A method of extracting a feature from a line pattern as claimed in claim 2, wherein there are four types of said primitive, a first primitive being a y-constant curve which is a horizontal line segment, a second primitive being an xy-changing curve which increases in the right direction and decreases in the left direction, a third primitive being an x-constant curve which is a vertical line segment, and a fourth primitive being a xy-reverse changing curve which increases in the left direction and decrease in the right direction.

4. A method extracting a feature from a line pattern as claimed in claim 2, wherein said binary relation has a connection relation between two primitive sequences.

5. A method extracting a feature from a line pattern as claimed in claim 2, wherein said binary relation has a connection relation between two primitive sequences at each of said singular points.

6. A line pattern recognition method comprising the steps of:
   (a) extracting a thinned line from the line pattern, said thinned line being represented by branches which are partitioned from each other by vertices;
   (b) finding one or a plurality of singular points which are formed on said thinned line, each of said singular points being defined as a vertex to which three or more branches are connected;
   (c) decomposing each of said singular points into a number of vertices that is the same as the number of branches connected thereto, based on a presumption that each of said singular points is included in all the branches connected to each of said singular points, wherein each of said vertices has the same coordinate as a corresponding singular point;
   (d) selecting vertices regarded as being identical to each other form the vertices obtained in said step (c), based on conditions in which the branches are connected to each of said singular points, wherein branches include the selected vertices are connected to each other, so that strokes are generated, each stroke having branches successively connected to each other;
   (e) converting each of the strokes into a primitive sequence obtained by a concatenation of primitives, each of which is a monotone curve, said monotone curve being a curve which is either non-increasing or non-decreasing;

(f) generating a binary relation between each two primitive sequences obtained by said step (e), so that the line pattern is featured by a combination of primitive sequences obtained by said step (e) and said binary relation between each of the primitive sequences; and (g) comparing a line pattern featured by a combination of primitive sequences obtained by said step (e) and said binary relation between each of the primitive sequences obtained by said step (f), with each of the standard models describing primitive sequences and the binary relation between each two primitive sequences, so that a matching of said line pattern and said standard models is performed on the basis of structural matching;

wherein a result of said matching is a result of a recognition of said line pattern.

7. A line pattern recognition method as claimed in claim 6 further comprising the steps of;

(h) extracting one or a plurality of parameters describing a shape of said line pattern when said line pattern matches a plurality of said standard models, and (i) adaptively applying a statistical analysis to said parameters, so that one of said standard models is limited on the basis of a result of said step (i).

* * * * *